Dec. 27, 1932.     W. M. DRENNON     1,892,187
VARIABLE AND REVERSIBLE PITCH PROPELLER
Filed June 13, 1930     2 Sheets-Sheet 1
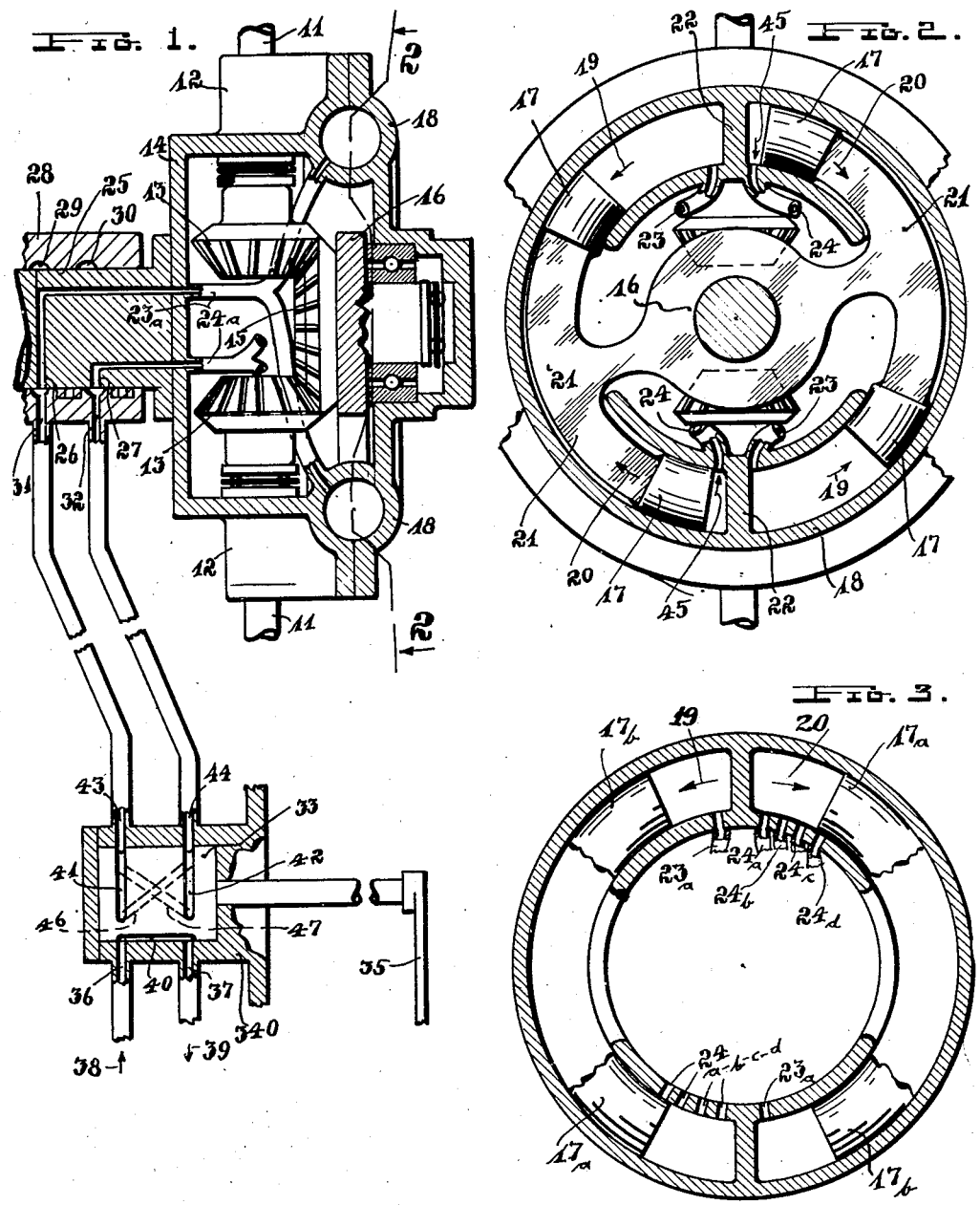
INVENTOR:
WILLIAM M. DRENNON,
By: Otto H. Ringer,
his Atty.

Dec. 27, 1932. W. M. DRENNON 1,892,187
VARIABLE AND REVERSIBLE PITCH PROPELLER
Filed June 13, 1930 2 Sheets-Sheet 2
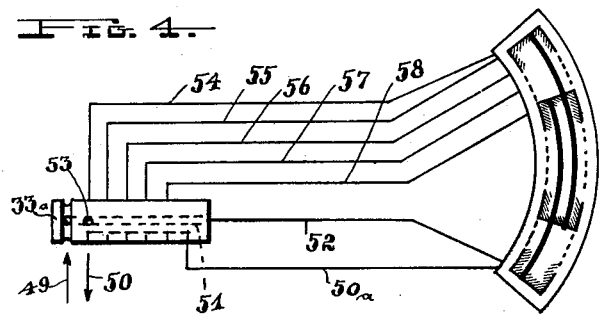
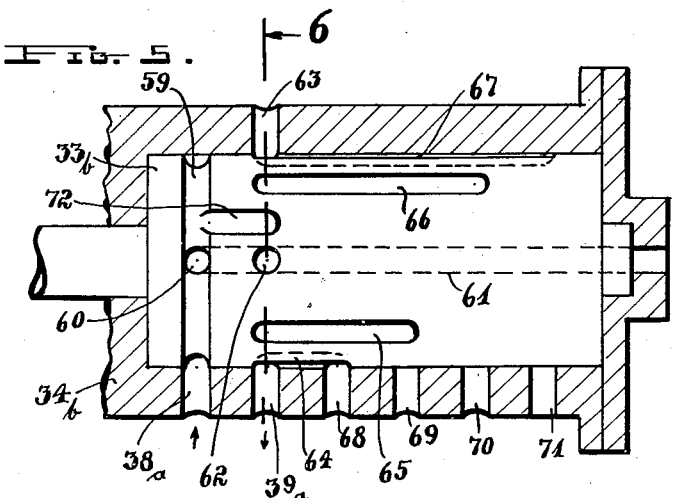
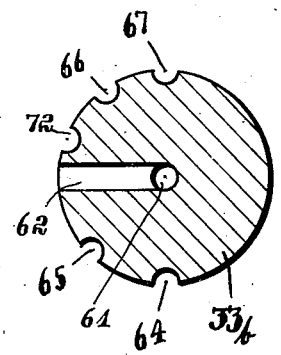
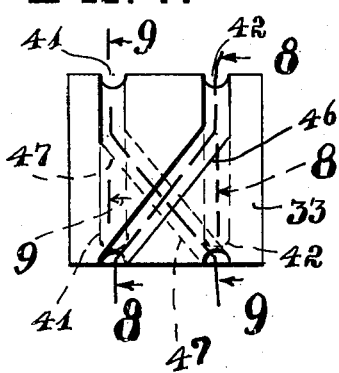
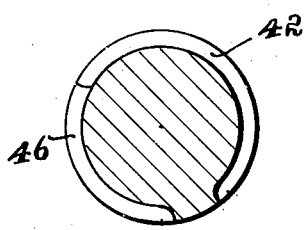
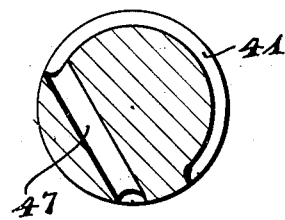
INVENTOR:
WILLIAM M. DRENNON,
By: his Atty.

Patented Dec. 27, 1932

1,892,187

UNITED STATES PATENT OFFICE

WILLIAM M. DRENNON, OF ANAHEIM, CALIFORNIA, ASSIGNOR OF ONE-TENTH TO W. L. EVERETT, OF ANAHEIM, CALIFORNIA

VARIABLE AND REVERSIBLE PITCH PROPELLER

Application filed June 13, 1930. Serial No. 460,887.

This invention relates to devices used for controlling the pitch of a propeller.

One of the objects of this invention is to provide a control whereby the pitch of a propeller can be varied, reversed, and held in or brought to a certain predetermined position.

Another object is to provide a control by which the several blades of a propeller can be maintained uniformly.

Another object is to provide controlling means that can be made to actuate propeller blades during operations.

Another object is to provide controlling means in conjunction with a pressure apparatus and operative thereby.

Other objects will appear from the following description and appended claim as well as from the accompanying drawings, in which—

Fig. 1 is a fragmentary midsectional view of a propeller-hub and co-operating parts designed and arranged to operate according to this invention.

Fig. 2 is a fragmentary cross section of the hub illustrated in Fig. 1, taken on line 2—2.

Fig. 3 is a fragmentary cross section similar to the illustration of Fig. 2, of a somewhat diagrammatical form, to illustrate the checking of the movements of the pistons and thereby of the setting of the propellers.

Fig. 4 is a schematic illustration of interconnections between a cylinder with several outlets and inlets for varying the pitch of connected propellers and reversing movements.

Fig. 5 is a fragmentary detail longitudinal midsectional view of a control-valve-housing with an inserted valve, designed with various conduits and channels for reversing and checking operations.

Fig. 6 is a cross section of the valve on line 6—6 of Fig. 5.

Fig. 7 is a fragmentary side elevation of the valve illustrated in Fig. 1, showing the channels and conduits as seen on the opposite side.

Fig. 8 is a cross section on line 8—8 of Fig. 7.

Fig. 9 is a cross section of the valve illustrated in Fig. 7, taken on line 9—9.

Though the principles of this invention are applicable to other types of propellers, particular reference is taken to propellers used on aeronautical apparatus, where a control of the pitch of the propellers from the pilot seat may be of great service.

Inasmuch as conditions change rapidly and frequently as a pilot advances through the air, a firmly or permanently mounted propeller may not at all times act or serve favorably.

The present invention involves therefore features and principles designed to enable the pilot to adapt the propeller to changing conditions in the air.

Each propeller blade is preferably provided with a shaft about which it can turn in a manner to change the pitch and even to reverse the propeller blade to a position that an operation and actuation in the opposite direction may be expected.

As illustrated in the drawings, two shafts are indicated at 11 in Fig. 1 which may support propellers, the shafts being turnable in the lugs 12, forming a part of a housing that replaces the normal propeller-hub. Bevelgears 13 are mounted on the ends of the shafts, within the housing 14, meshed with a control-gear 15. The control-gear is mounted on a turntable piston hub 16, on which the pistons 17 are also supported. The pistons are movable within the cylinders 18, pistons and cylinders being arranged in pairs under counteracting pressure-supplying means, and so that the pressure medium can be applied from opposite sides in a circular manner.

In the illustration of Fig. 2, for instance, a pressure medium can be applied in the direction of the arrows 19 for a turning movement of the piston hub 16 in one direction, and, then again, the pressure medium may be applied in the direction of the arrows 20 for a turning movement in the opposite direction.

Of course, instead of having distinct small pistons on the opposite ends to be acted upon by the pressure medium in the opposite directions, as stated above, the pistons may be extended from end to end, as will easily be understood without further illustration, instead of having the flat portions 21 of the supporting piston hub 16 arranged between the comparatively short individual pistons as illustrated.

It should furthermore be understood that one pair of pistons, or a single elongated double-ended piston could easily be made to work satisfactory instead of the two pairs of pistons illustrated in the drawings, inasmuch as an actuating in opposite directions of the one piston hub 16 is all that is required to result in a proper operation of the device.

The partitions 22 serve as cylinder ends, so that a pressure medium can be injected, either through the conduits 23 to result in a movement in the direction of the arrows 19, or through the conduits 24 to result in a movement in the direction of the arrows 20.

Having illustrated two pairs of pistons, to require two conduit connections 23 and two other conduit-connections 24 as clearly indicated in Fig. 2, each pair of conduit-connections serving the same purpose, these connections are preferably branched from main connections as indicated at $23_a$ and $24_a$ in Fig. 1, so that one single double-piston can be supplied with a pressure medium by a single main supply as well as any number of pairs of pistons, the main supply embodying an inlet and an outlet.

In order to facilitate a reversing of the propeller-control, both sides or branches of the main-supply are designed to serve either as inlet or outlet. Both sides of main supply continue in form of conduits through the central portion or hub 25 of the housing, terminating in a sidewise direction as indicated at 26 and 27.

The central or hub portion of the housing is journaled at 28, being a part of the engine to which the propeller is applied. This journal portion or bearing is provided with grooves 29 and 30 in order to maintain the sidewise terminating conduits 26 and 27 in communication with conduits 31 and 32 while the housing is rotating and the whole apparatus is in operation, the conduits 31 and 32 extending outwardly from the stationary bearing.

A control apparatus is connected to these outwardly extending conduits of any suitable form or eventually conventional form obtainable on the open market, though in the drawings several specially designed mechanisms have been illustrated.

In conjunction with the illustration in Fig. 1, a rotating control valve is roughly outlined, by which a pressure medium from any suitable source, as from a pump can be controlled and transferred to the propeller controlling apparatus through the conduits described above.

The valve 33 is turnably mounted in the valve-housing 34 operative by any conventional means as by a lever indicated at 35. The two connections 36 and 37 may be the terminals of pipes from a pump or any other source of supply of a pressure medium, adapted to circulate the pressure medium in a certain direction or manner as in the direction of the arrows 38 and 39, entering and leaving the valve housing always in just this manner.

The valve 33 is provided with corresponding channels or conduits to guide the pressure medium circulated at or by the supply source in a suitable or desired manner, the short channel 40 serving to form the communication between the connections 36 and 37 in the inoperative position of the valve thereby maintaining a complete circulating path through the connections with the supply source.

Channels 41 and 42 are arranged so that whenever a communication is established with the connections 36 and 37, a communication is also completed with the connections 43 and 44 to pass the pressure medium therethrough to the propeller controlling apparatus, the pressure medium passing in at 36, along the channel 41, through the connections 43 and 31, and through the conduit 23 to act upon the propeller-control in one certain direction so as to move the piston-mechanism in the direction of the arrows 19; while through the same movement from the opposite ends or sides of the piston-mechanism the previously accumulated pressure medium is forced out in the direction of the arrows 45 through the conduits 24, through the connections 32 and 44, along the channel 42, and through the connection 37 in the direction of the arrow 39 back to the source.

Other channels 46 and 47 in the valve 33 are arranged in a manner to reverse the direction of flow of the pressure medium by having these channels cross one another. A simple manner to accomplish this is illustrated in Figs. 7, 8, and 9, one channel being continued in the surface of the valve while the other channel has been provided through the body or material of the valve.

In cases where it is desirable to control a propeller in a certain pitch or and from one pitch to another pitch, a simple arrangement is to check the pressure-medium on the outgoing side of the piston mechanism. This is illustrated in Figs. 3, 4, 5 and 6.

From the illustration in Fig. 3, for instance, it will be clear that the piston $17_a$ can not move any further in the direction of the arrow 19 if all the conduits $24_a$, $24_b$, and $24_c$ are shut off and only the conduit $24_d$ is left in communication with the main outlet of the control valve.

Any pressure medium injected in the direction of the arrow 19 through the conduit $23_a$, to act on the piston-end $17_b$ for a movement in the direction of the arrow 19 would at best only tend to compress the remaining pressure medium between the partition 22 and the piston-end $17_a$ to some extent to eventually cause the piston-end 17a to pass slightly beyond the conduit 24a, as for instance illustrated in Fig. 3.

Providing then these conduits or apertures at such points that will turn the bevel gears and thereby the attached propeller to a certain pitch enables a pilot to adjust or hold his propeller blades in certain predetermined positions.

In the schematic illustration of Fig. 4, several lines are drawn in the directions of which the pressure medium may pass, the incoming passage from the main supply being always in the direction of the arrow 49 and the outgoing passage in the direction of the arrow 50.

From the ingoing passage the pressure medium may pass through the central conduit 51 of the valve 33a in the direction of the line 52 to one end of the cylinder or, whenever the valve is turned or set suitably, through the side branch 53 in the valve in the direction of the line 54 to the opposite end of the cylinder, for a reversing operation.

Considering that for or during reversing operations variations in the speed are not likely to be to such an extent as to require a change of pitch, the connections for an adjusting or control of the pitch are not deemed necessary on both ends of the cylinder and are therefore not illustrated or indicated so though it would not be impossible to make such an arrangement, as will easily be understood without further illustration or explanation, being a mere matter of duplication of the above.

In Fig. 4, the lines 55, 56, 57, and 58 are to indicate how different points or portions of a cylinder can be connected to the outlet 50, so that a piston movable within the cylinder can be checked to the extent that the outlet end of the cylinder is maintained closed by certain of the outlet conduits. If the outlet conduit arranged about along the line 55 is maintained open, the pressure medium may escape entirely and the piston may move to the utmost end of the cylinder, while, if any conduits arranged along approximately the lines 55, 56, and 57 are maintained shut off and the conduit arranged along approximately the line 58 alone is maintained open, a pressure medium accumulated in the cylinder can escape only as far as the cylinder is open, and an inserted piston can move only to such an extent and will be checked in its movement at such a point.

Figs. 5 and 6 illustrate in detail one simple form of valve by which an operation along the above-indicated lines can be made possible.

The valve 33b is provided with an annular groove indicated at 59 from which a bore 60 extends to the center of the valve in communication with the central conduit indicated in dotted lines at 61 to connect with the inlet to the control apparatus in one direction; while the side-bore 62 extending from the main central bore outwardly, whenever brought into alignment with the connection 63 of the valve-housing 34c can connect the supply with the inlet to the propeller control in the opposite direction.

On turning the short side bore 62 into alignment with the main outlet 39b in the valve-housing 34b, the neutral circulating path is completed for the supply source by way of the main inlet 38b and main outlet 39b and through the groove 59 in communication with the inward bore 60 and the central bore 61.

Grooves 64, 65, 66, and 67 longitudinally disposed in the outer surface of the valve body 33b serve to connect the outlet 39b with the several connections 68, 69, 70 and 71 in the housing 34b by which a corresponding number of points in a cylinder can be connected in the manner suggested above in the description with reference to the illustration of Fig. 4. The groove 72 is provided to connect the opposite end of a cylinder for reversing operations without the necessity of passing the pressure medium through the central bore.

Having thus described my invention, I claim:

In a propeller structure in which the individual propeller-blades are turnably mounted and operative by a gear-mechanism, a turnable piston-structure with piston tops facing and moving in a circular direction in operative connection with said gear mechanism, and a cylinder having radially disposed partitions to form cylinder-heads and having connections for a pressure medium in the cylinder-walls at different points away from such heads and adapted to hold said piston-structure on opposite sides of such cylinder-heads in predetermined positions near certain of such points when the pressure medium is passed through certain of the connections.

In testimony that I claim the foregoing as my invention I have signed my name.

WILLIAM M. DRENNON.